(12) United States Patent
Jang et al.

(10) Patent No.: US 6,716,900 B2
(45) Date of Patent: Apr. 6, 2004

(54) FLAMEPROOF STYRENE CONTAINING GRAFT RESIN COMPOSITIONS SUBSTANTIALLY FREE OF PHENOLIC RESINS AND CONTAINING STYRENE/ACRYLONITRILE RESIN COMPATABILIZER

(75) Inventors: Bok-Nam Jang, Seoul (KR); Se-Jong Kim, Kyungki-do (KR); Young-Kil Chang, Seoul (KR); Gyu-Cheol Lee, Kyungki-do (KR)

(73) Assignee: Cheil Industries, Inc., Kyungbuk (KR)

( * ) Notice: Subject to any disclaimer, the term of this patent is extended or adjusted under 35 U.S.C. 154(b) by 146 days.

(21) Appl. No.: 10/052,205

(22) Filed: Jan. 16, 2002

(65) Prior Publication Data

US 2002/0161081 A1 Oct. 31, 2002

Related U.S. Application Data

(63) Continuation-in-part of application No. 10/011,056, filed on Dec. 6, 2001, and a continuation-in-part of application No. 09/580,907, filed on May 31, 2000, which is a continuation-in-part of application No. 09/473,607, filed on Dec. 29, 1999, now abandoned, and a continuation-in-part of application No. 09/473,553, filed on Dec. 29, 1999, now abandoned, which is a continuation of application No. 09/233,415, filed on Jan. 19, 1999, now abandoned.

(30) Foreign Application Priority Data

| Sep. 2, 1998 | (KR) | ............................................. 99-36004 |
| Jul. 14, 1999 | (KR) | ............................................. 99-28442 |
| Jul. 14, 1999 | (KR) | ............................................. 99-28443 |
| Jul. 14, 1999 | (KR) | ............................................. 99-28444 |

(51) Int. Cl.$^7$ .......................... C08K 5/521; C08K 5/523
(52) U.S. Cl. ........................ 524/145; 524/141; 524/143
(58) Field of Search ................................ 524/141, 143, 524/145

(56) References Cited

U.S. PATENT DOCUMENTS

| 4,360,618 | A | * | 11/1982 | Trementozzi | ................ | 524/141 |
| 4,578,423 | A | * | 3/1986 | Deets et al. | ................... | 525/68 |
| 4,618,633 | A | * | 10/1986 | Taubitz et al. | ................. | 524/80 |
| 4,966,814 | A | * | 10/1990 | Ohzeki | ........................ | 428/457 |
| 5,621,029 | A | * | 4/1997 | Eckel et al. | ................. | 524/127 |

* cited by examiner

Primary Examiner—Peter Szekely
(74) Attorney, Agent, or Firm—Maria Parrish Tungol

(57) ABSTRACT

A flameproof thermoplastic resin composition is substantially free of phenolic resin, red phosphorous and silicone resin and comprises (A) about 40–95 parts by weight of a rubber modified styrene-containing resin comprising (a1) about 20–95% by weight of a styrene-containing graft copolymer resin containing about 19–50% by weight of acrylonitrile in the copolymer excluding rubber and (a2) about 5–80% by weight of a styrene-containing copolymer containing about 19–50% by weight of acrylonitrile; (B) about 5–60 parts by weight of a polyphenylene ether resin; (C) about 2–40 parts by weight of a compatabilizer comprising (c1) a styrene-containing copolymer containing about 5–18% by weight of acrylonitrile in the copolymer per 100 parts by weight of the sum of (A) and (B) or (c2) a styrene-containing graft copolymer having up to about 60% by weight of rubber wherein the compatabilizer contains about 5–18% by weight of acrylonitrile in the copolymer excluding rubber, per 100 parts by weight of the sum of (A) and (B); and (D) about 5–30 parts by weight of an aromatic phosphoric acid ester per 100 parts by weight of the sum of (A) and (B). The physical properties and flame retardance of the resin compositions according to the present invention are adversely affected by the presence of 3% or more by weight of polycarbonate based on the total weight of the composition.

32 Claims, No Drawings

FLAMEPROOF STYRENE CONTAINING GRAFT RESIN COMPOSITIONS SUBSTANTIALLY FREE OF PHENOLIC RESINS AND CONTAINING STYRENE/ ACRYLONITRILE RESIN COMPATABILIZER

This application is a continuation-in-part of Ser. No. 09 473,607 filed on Dec. 29, 1999 now abandoned and Ser. No. 09 473,553 filed on Dec. 29, 1999 now abandoned and Ser. No. 09 580,907 filed May 31, 2000, and Ser. No. 10 011,056 filed on Dec. 6, 2001 which is a continuation of Ser. No. 09 233,415 filed Jan. 19, 1999, now abandoned.

FIELD OF THE INVENTION

The present invention relates to a flameproof thermoplastic resin composition. More particularly, the present invention relates to a flameproof thermoplastic resin composition substantially free of phenolic resins that comprises a rubber modified styrene-containing resin and a polyphenylene ether resin as a base resin, a styrene-acrylonitrile copolymer as a compatibilizer, and an aromatic phosphoric acid ester as a flame retardant.

BACKGROUND OF THE INVENTION

A rubber modified styrene-containing resin has a good processability, a high impact strength, and a good appearance. Accordingly, the resin has been widely applied to electric appliances and office supplies. In case that a rubber modified styrene-containing resin is applied to personal computers, facsimiles, and the like, which emit heat, flame-retardant property should be given to the resin for inhibiting combustibility thereof. A widely known method for the flame retardancy is that a halogen-containing compound or a antimony-containing compound is added to a rubber modified styrene-containing resin to give flame-retardant property. The examples of the halogen-containing compounds used in above method are, for example, polybromodiphenyl ether, tetrabromobisphenol A, epoxy compounds substituted by bromine, chlorinated polyethylene, etc. An antimony trioxide or an antimony pentaoxide is commonly used as an antimony-containing compound.

The methods for improvement of flame-retardant property by applying a halogen- and antimony-containing compound have advantages such as easy acquirement of the flame-retardant property and no degradation of the physical properties. However, the disadvantages could be observed that the halogen-containing compound results in the corrosion of the mold itself by the hydrogen halide gases released during the molding process and is fatally harmful due to the toxic gases liberated in case of fire. Especially, since a polybromodiphenyl ether, mainly used for a halogen-containing flame retardant, can produce toxic gases such as dioxin or furan during combustion, flame retardants which are prepared without a halogen-containing compound have become a major concern in this field.

It is commonly known to apply a phosphorus or nitrogen compound as halogen-free flame retardant to a resin composition. However, usage of only a phosphorus compound deteriorates heat resistance of a rubber modified styrene-containing resin and does not impart sufficient flame retardancy.

Generally, when a rubber modified styrene-containing resin such as ABS is burned, a char is not produced due to decomposition and vaporization in most parts (Journal of Applied Polymer Science, 1998, vol 68, p1067). Therefore, to impart an effect of flame retardancy, it has been considered necessary to add a char-forming agent to a resin composition, which plays a role to prohibit entrance of oxygen and emission of fuel by forming char on the surface of rubber with three-dimensional carbon chain bonds under combustion.

Japanese Patent Laid-open No. 7-48491 discloses a flameproof thermoplastic resin, made by adding a novolac phenolic resin and a phosphoric acid ester into a thermoplastic copolymer resin composed of a rubber copolymer and an aromatic vinyl monomer. It was found that in order to obtain a good property of flame retardancy, a phenolic resin as a char-forming agent and a large amount of phosphoric acid ester compound as a flame retardant is required. However, in this case, the heat resistance of the resulting resin composition is reduced.

U.S. Pat. No. 4,618,633 (Taubitz et al.) discloses thermoplastic compositions containing polyphenylene ether and a styrene-acrylonitrile copolymer that also contain novolaks (linear, non-crosslinked phenol/aldehyde resins) which are disclosed as being added to compensate the decrease in heat distortion resistance resulting from the addition of phosphorous flameproofing agents.

U.S. Pat. No. 5,605,962 (Suzuki et al.) discloses flame retardant compositions containing specific rubber-reinforced resins, a phenol resin, and an organic phosphorous compounds as flame retardants. Other resins are disclosed as optionally present include polyphenylene oxide.

U.S. Pat. No. 4,360,618 (Trementozzi) and U.S. Pat. No. 4,578,423 (Deets et al.) disclose polyblends of polyphenylene oxide and styrene/acrylonitrile polymers which have specified acrylonitrile content. The use of SAN copolymers as compatabilizers for polyphenylene oxide and ABS type resins is not disclosed.

U.S. Pat. No. 5,621,029 (Eckel et al.) disclose flame retardant thermoplastic resin compositions prepared from polycarbonate and graft copolymer. The flame retardant used in the compositions is a synergistic combination of silicone resin and polyphenylene oxide to reduce the amount of phosphoric ester flame retardant. As disclosed in U.S. Pat. No. 4,618,633, decrease in properties such as heat distortion resistance results from the addition of phosphorous flameproofing agents. In U.S. Pat. No. 5,621,029, styrene-acrylonitrile copolymers are disclosed as optional components. The amounts of ABS polymer and the polyphenylene oxide are minor compared to the major amount of the base resin, polycarbonate so compatability of the ABS polymer and polyphenylene is not addressed by the reference.

U.S. Pat. No. 4,966,814 (Ohzeki) discloses a flame retardant composition that is susceptible to electroless plating comprising polyphenylene ether resin and a rubber-modified resin that also comprises red phosphorous and phosphoric acid ester in specific amounts. The lower limit of the amount of red phosphorous is 1% by weight. When a lower amount, 0.8% by weight was used, the flame retardance of the composition was poor. Moreover, the use of red phosphorous disclosed in U.S. Pat. No. 4,966,814 would be expected to result in the production of toxic phosphine gas during the process of preparing the compositions or during the combustion of products made from the compositions. Furthermore, the presence of even small amounts of red phosphorous cause a reddish color in the resulting resin composition.

U.S. Ser. No. 10,011,056, herein incorporated by reference, discloses a halogen-free flameproof resin composition having a good property of flame retardancy prepared by mixing a styrene-acrylonitrile copolymer having from 5 to 18% by weight of acrylonitrile as a compatibilizer, an aromatic phosphoric acid ester compound as a main flame-retardant and a phenolic resin as a further flame-retardant to improve flame-retardant property of a resin composition and adding the mixture to a base resin comprising a rubber-modified styrene-containing resin and a polyphenylene ether resin. Good mechanical properties as well as a good improvement of flame retardancy and heat resistance were obtained, however, the use of a phenolic resin as char-formation agent of ABS resin causes the degradation of heat stability and weatherability.

SUMMARY OF THE INVENTION

A flameproof thermoplastic resin composition substantially free of phenolic resin and red phosphorous comprising:

(A) about 40–95 parts by weight of a rubber modified styrene-containing resin comprising:
  (a1) about 20–95% by weight of a styrene-containing graft copolymer resin containing about 19–50% by weight of acrylonitrile in the copolymer excluding rubber and
  (a2) about 5–80% by weight of a styrene-containing copolymer containing about 19–50% by weight of acrylonitrile;

(B) about 5–60 parts by weight of a polyphenylene ether resin;

(C) about 2–40 parts by weight of a compatabilizer comprising
  (c1) a styrene-containing copolymer containing about 5–18% by weight of acrylonitrile in the copolymer per 100 parts by weight of the sum of (A) and (B) or
  (c2) a styrene-containing graft copolymer having up to about 60% by weight of rubber wherein the compatabilizer contains about 5–18% by weight of acrylonitrile in the copolymer excluding rubber, per 100 parts by weight of the sum of (A) and (B); and (D) about 5–30 parts by weight of an aromatic phosphoric acid per 100 parts by weight of the sum of (A) and (B). The physical properties and flame retardance of the resin compositions according to the present invention are adversely affected by the presence of 3% or more by weight of polycarbonate based on the total weight of the composition.

The present inventors have discovered flameproof resin compositions containing a base resin comprised of a rubber modified styrene-containing resin such as an ABS resin wherein the compositions are substantially free of phenolic resin that causes the degradation of heat stability and weatherability in order to solve the above-mentioned problem. Generally, an ABS resin and a polyphenylene ether resin are not compatible together in a blend so physical properties are degraded during extrusion processing to produce products having poor mechanical strength. Accordingly, the present inventors have invented thermoplastic resin compositions which are substantially free of phenolic resins in which compatibility between an ABS resin according to the present invention and a polyphenylene resin is achieved by adding a styrene-acrylonitrile copolymer or styrene-containing graft copolymer containing certain amounts of acrylonitrile as a compatabilizer. The compositions according to the present invention have a desirable balance of mechanical and physical properties, i.e., good mechanical properties together with good flame retardancy, heat resistance and heat stability.

The compositions according to the present invention are substantially free of toxic materials such as red phosphorous which imparts color to the resin and release toxic gas. The compositions also do not contain halogen-containing compounds which cause environmental pollution during preparation or combustion of the resin.

DETAILED DESCRIPTION OF THE INVENTION (A) Rubber Modified Styrene-containing Resin A rubber modified styrene-containing resin means a styrene-containing graft copolymer resin such as ABS, that contains a styrene-containing copolymer resin such as SAN. In the rubber modified styrene-containing resin, rubber phase copolymers are dispersed in the form of particles in a matrix. The resin is prepared by mixing a styrene-containing monomer and an unsaturated nitrile monomer polymerizable therewith in the presence of a rubber phase polymer. Such rubber-modified styrene-containing resin is prepared by known methods such as emulsion polymerization, suspension polymerization or bulk polymerization, and is conventionally produced by an extrusion with a styrene-containing graft copolymer resin and a styrene-containing copolymer resin. In a bulk polymnerization, both a styrene-containing graft copolymer resin and a styrene-containing copolymer resin are prepared together in one process. In other words, one step process is employed to produce a rubber modified styrene-containing resin. In other polymerizations, a styrene-containing graft copolymer resin and a styrene-containing copolymer resin may be prepared separately. In either case, the contents of rubber in a final rubber modified styrene-containing resin to the total weight of the base resin are preferably in the range of about 5–30% by weight. Examples of rubber modified styrene-containing resins are acrylonitrile-butadiene-styrene (ABS) copolymer resin, acrylonitrile-acryl rubber-styrene (AAS) copolymer resin, acrylonitrile-ethylenepropylene rubber-styrene (AES) copolymer resin, and the like.

In the rubber modified styrene-containing resin, a styrene-containing graft copolymer resin is combined with a styrene-containing copolymer resin in consideration of compatibility thereof. In this invention, a rubber modified styrene-containing resin is prepared by mixing about 20–95% by weight of a styrene-containing graft copolymer resin (a1), preferably about 25–70% by weight with about 5–80% by weight of a styrene-containing copolymer (a2), preferably about 30–75% by weight.

Styrene-containing Graft Copolymer Resin (a1)

Examples of a rubber used for a styrene-containing graft copolymer resin are a diene-containing rubber such as polybutadiene, poly(styrene-butadiene) and poly(acrylonitrile-butadiene); a saturated rubber in which hydrogen is added to said diene-containing rubber; an isoprene rubber; a chloroprene rubber; a polybutyl acrylate; and a terpolymer of ethylene-propylene-diene. It is preferable to use a diene-containing rubber, more preferably a butadiene-containing rubber.

Styrene-containing monomers suitable for preparing graft copolymer resin (a1) are styrene-containing monomers such as styrene, α-methylstyrene, p-methylstyrene, and related styrenic monomers known in the art. Styrene is the most preferred. At least one unsaturated nitrile monomer is copolymerized with the styrene-containing monomers. It is preferred that the copolymerizable monomer is acrylonitrile or methacrylonitrile. References to acrylonitrile herein do not mean and should not be construed as meaning that methacrylonitrile cannot be used in place of or in combination with acrylonitrile.

The content of rubber of graft copolymer resin (a1) is preferably in the range of about 10–60% by weight based on the total weight of a graft copolymer resin. Excluding the rubber component, it is preferable that the amount of styrene-containing monomer units is about 50–81% by weight, preferably about 65–80% by weight and the amount of unsaturated nitrile-containing monomer units is about 19–50% by weight, preferably about 20–35% by weight. The rubber modified styrene-containing resin (A) is comprised of about 20–95% by weight of a styrene-containing graft copolymer resin (a1), preferably about 20–70% by weight of a styrene-containing graft copolymer resin (a1).

In addition, in order to give good characteristics of processability and heat resistance, other monomers such as acrylic acid, methacryl acid, maleic anhydride and N-substituted maleimide can be added in the graft polymerization. The amounts of the other monomers are in the range of about 0 to 40% by weight based on the styrene-containing graft copolymer resin as long as the amount of unsaturated nitrile monomer units in graft copolymer resin (a1) is between about 19–50% weight.

To acquire good impact strength and appearance when said styrene-containing graft copolymer is prepared, the average size of rubber particles is preferably in the range of from 0.1 to 4 $\mu$m.

Styrene-containing Copolymer Resin (a2)

The styrene-containing copolymer resin of the present invention is prepared by copolymerizing a styrene-containing monomer and an unsaturated nitrile monomer, depending on the ratio and compatibility between monomers. The styrene-containing copolymer (a2) used in the present invention contains about 19–50% by weight of unsaturated nitrite monomer units preferably about 20–35% by weight.

Examples of the styrene-containing monomer suitable for use in the present invention are styrene, $\alpha$-methylstyrene, p-methylstyrene, and related styrenic monomers known in the art. Styrene is the most preferred. The amount of styrene-containing monomer in the total copolymer resin is typically about 50–81% by weight. At least one unsaturated nitrite monomer is copolymerized with the styrene-containing monomer. It is preferred that the unsaturated nitrite monomer is acrylonitrile or methacrylonitrile. It is preferred that copolymer resin (a2) contain about 19–50% by weight, preferably about 20–35% by weight, of the unsaturated nitrite monomer units.

The rubber modified styrene-containing resin (A) contains about 5–80% by weight of a styrene-containing copolymer (a2), preferably about 30–75% by weight. In addition, about 0 to 40% by weight of a monomer such as acrylic acid, methacrylic acid, maleic anhydride and N-substituted maleimide may be added and copolymerized thereto as long as the amount of unsaturated nitrite in (a2) is between about 19–50% by weight. The base resin comprises about 40–95 parts by weight of the rubber modified styrene-containing resin (A), preferably about 60–85 parts by weight. The rubber modified styrene-containing resin (A) is employed as a base resin along with (B) a polyphenylene ether.

(B) Polyphenylene Ether Resin

Polyphenylene ether resin is employed as a base resin to improve flame retardancy, heat resistance and rigidity of the resin composition according to the present invention. As examples of ether, the polyphenylene ether resin, poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene)ether, and copolymer of poly(2,6-dimethyl-1,4-pheylene)ether and poly(2,3,5-triethyl-1,4-phenylene)ether can be used. Preferably, copolymer of poly(2,6-dimethyl-1,4-phenylene)ether and poly(2,3,6-trimethyl-1,4-phenylene)ether, and poly(2,6-dimethyl-1,4-phenylene)ether are preferably used, more preferably poly(2,6-dimethyl-1,4-phenylene)ether is used. The degree of polymerization of polyphenylene ether is not limited specifically, but considering heat-stability or processability of the resin composition, it is preferable that the viscosity of polypheylene ether is in the range of from 0.1–0.8 measured in a chloroform solvent at 25° C.

The compositions of the present invention contains about 5–60 parts by weight, preferably about 15–40 parts by weight of the polyphenylene ether resin (B).

(C) Styrene-acrylonitrile Copolymer or Styrene-containing Graft Copolymer Resin Having from About 5–18% by Weight of Acrylonitrile A compatabilizer (C) comprising a styrene-acrylonitrile copolymer (c1) or a styrene-containing graft copolymer (c2) is added to the base resin to improve compatibility between the rubber modified styrene-containing resin (A) and the polyphenylene ether resin (B). The styrene-acrylonitrile copolymer (c1) comprises about 82–95% by weight of styrene and about 5–18% by weight of acrylonitrile, preferably 10–18% by weight of acrylonitrile.

The styrene-containing graft copolymer (c2) comprises about 82–95% by weight of styrene and about 5–18% by weight of acrylonitrile, preferably 10–18% by weight of acrylonitrile, excluding the amount of any rubber. To prepare the styrene-containing graft copolymer (c2), a styrene-containing coplomyer is grafted with up to about 60% by weight of rubber. The method for polymerization of the copolymer above may optionally be selected from emulsion polymerization, suspension polymerization, and bulk polymerization in accordance with the conventional processes. It is preferable that the weight average molecular weight of the copolymer is in the range of from 50,000 to 300,000.

A third monomer may be employed for copolymerization with styrene-acrylonitrile as long as the resulting copolymer (c1) or graft copolymer (c2) contains about 5–18% by weight of acrylonitrile. The examples of the third monomer are methacrylate, maleic anhydride, phenyl maleimide, etc. To advance heat resistance, $\alpha$-methyl styrene may be used instead of styrene.

In the present invention, the amount of a styrene-acrylonitrile copolymer (c1) or a styrene-containing graft copolymer (c2) used as compatibilizer is preferably about 2–40 parts by weight, preferably 5–20 parts by weight per 100 parts by weight of the base resin.

If the copolymer (C) is not added, the resin composition shows reduction in mechanical properties due to low compatibility.

(D) Aromatic Phosphoric Acid Ester

The aromatic phosphoric acid ester compound used in the present invention is a compound having the following structural formula:

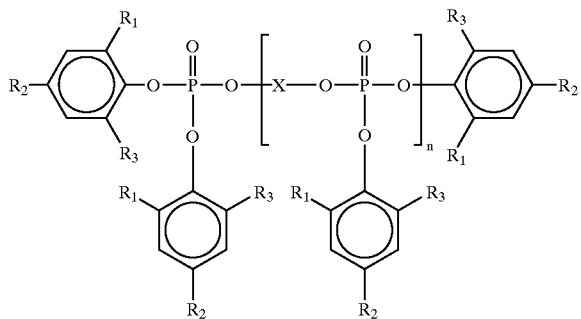

wherein $R_1$, $R_2$ and $R_3$ independently of one another are hydrogen or $C_1$–$C_4$ alkyl; X is a dialcohol derivative selected from the group consisting of resorcinol, diphenol, hydroquinol, bisphenol-A and bisphenol-S; and n is 0–4.

Where n is 0, the compound represented in the structural formula (I) is monophosphate, and examples thereof include triphenylphosphate (TPP), tricresyl phosphate, tri(2,6-dimethyl phenyl)phosphate, tri(2,4,6-trimethyl phenyl) phosphate, tri(2,4-ditertiary butyl phenyl)phosphate, tri(2,6-ditertiary butyl phenyl)phosphate, and the like, and where n is 1, the compounds include resorcinol-bis-(diphenyl) phosphate, resorcinol-bis-(2,6-dimethyl phenyl)phosphate, resorcinol-bis(2,4-ditertiary butyl phenyl)phosphate, hydroquinol (2,6-dimethyl phenyl)phosphate, hydroquinol(2,4-ditertiary butyl phenyl)phosphate, and the like. The compounds can be used alone or in mixtures thereof. Triphenylphosphate is a preferred phosphate flame retardant.

In the present invention, the triphenyl phosphate is used in the form of white-colored crystalline powder having a melting point of 47 to 49° C. In addition, a phosphoric acid ester compound having a structure of phloroglucinol can be used in this invention. Such phosphoric acid ester compounds are represented by the following formula:

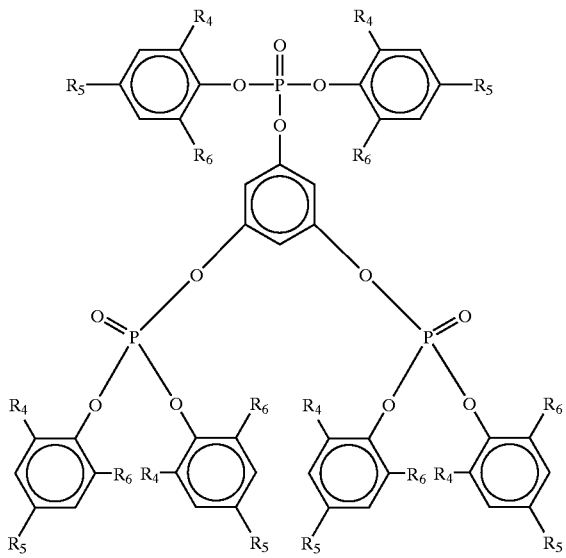

wherein $R_4$, $R_5$ and $R_6$ are hydrogen or $C_1$–$C_4$ alkyl.

Examples of the phosphoric acid ester compound having the above structural formula include 1,3,5-tri(diphenyl phosphate)fluoroglucinol, 1,3,5-tri(dicresyl phosphate) fluoroglucinol, 1,3,5-tri(dixyenyl phosphate)fluoroglucinol, and the like.

However, it is preferable that the phosphate compound or mixture thereof has a molecular weight of less than 1,500, because the compound having a molecular weight of more than 1,500 does not provide the resin with a good flame-retardancy. Also, phosphoric acid ester compounds having melting points of more than about 90° C. are preferred. Examples of such phosphoric acid ester compounds are disclosed in U.S. Ser. No. 10,011,056. Preferred phosphate esters include tri(2,6-dimethylphenyl)phosphate and resorcinol-bis-(2,6-dimethylphenyl)phosphate. The phosphoric acid ester compound having a melting point of below 90° C. can be used together if the heat deformation temperature is maintained at more than 90° C. which is typically required for commercial purposes.

In the present invention, the aromatic phosphoric acid ester compound as a flame retardant is used in the amount of from about 5–30 parts by weight, preferably about 5–20 parts by weight per 100 parts by weight of the base resin.

The compositions according to the present invention do not require the use of red phosphorous to have acceptable physical properties and flame retardance. Inclusion of red phosphorous as disclosed in U.S. Pat. No. 4,966,814 would be expected to result in the production of toxic phosphine gas during the process of preparing the compositions or during the combustion of products made from the compositions. Furthermore, the presence of red phosphorous causes a reddish color in the resin composition. Reddish color has been observed in compositions containing as little as 0.5 parts by weight based on 100 parts by weight of (A) and (B). Reddish color can be determined by visual inspection or other methods known in the art using a colorimeter.

The compositions according to the present invention are substantially free of red phosphorous which means that any amount of red phosphorous in the composition is less than 0.5 parts by weight based on 100 parts by weight of (A) and (B). It is preferred that the compositions according to the present invention contain about 0% by weight of red phosphorous which is not intended to exclude trace amounts of red phosphorous that do not affect the color of the resin composition.

Unlike the compositions disclosed in the prior art such as those disclosed in U.S. Pat. Nos. 4,618,633 and 5,605,962, the compositions according to the present invention are substantially free of phenolic resin which means that any amount of phenolic resin present in the composition is less than 1 part by weight based on 100 parts by weight of (A) and (B) and does not adversely affect properties such as heat stability as measured by $\Delta E$. It is preferred that the compositions according to the present invention contain about 0% by weight of phenolic resin which is not intended to exclude trace amounts of phenolic resin that do not affect the properties of the composition.

If desired, a resin such as polyamide, polycarbonate, polyester, polystyrene, rubber reinforced polystyrene, polyacetal, polymethacrylic acid methyl, and silicon resin may be added optionally to the resin composition of this invention in the amount of from about 0–30 parts by weight per 100 parts by weight of the base resin as long as the amount added does not affect the flame retardance or physical properties of the composition in an undesirable manner. For example, the addition of 0.5 parts by weight of certain silicone resins based on 100 parts by weight based on 100 parts of (A) and (B) produces compositions with significantly decreased impact strength and flame retardancy. Therefore, the compositions according to the present invention do not require silicone resins such as those disclosed in U.S. Pat. No. 5,621,029 and are substantially free of silicone resins.

Substantially free of silicone resins means that any amount of silicone resin present in the composition is less than about 0.5 parts by weight based on 100 parts by weight of (A) and (B) and do not produce compositions that fail the UL 94 flame retardancy test and/or reduce the impact strength to values below acceptable commercial limits. The typical limit is 10 (Izod impact strength (1/8" notched)). It is preferred that the compositions according to the present invention contain about 0% by weight of silicone resin which is not intended to exclude trace amounts of silicone resin that do not have a significant adverse effect on the flame retardance and/or impact strength of the resin composition.

The compositions according to the present invention utilize the rubber modified styrene-containing resin (A) as a base resin along with a polyphenylene ether (B). Unlike the compositions of U.S. Pat. No. 5,621,029, polycarbonate is not used as the base resin in the compositions according to the present invention. The amounts of polycarbonate that may be present in the compositions according to the present invention do not include the amounts of 50% or more that are disclosed in U.S. Pat. No. 5,621,029. Such amounts in the compositions of the present invention would produce compositions that would fail the UL 94 flame retardancy test. When added to compositions according to the present invention, amounts of polycarbonate as little as 3% by weight of the total composition had adverse effects on the physical properties and flame retardance of the resulting composition.

Typically, any amount of polycarbonate present in the compositions of the present invention is less than about 2 weight % based on the weight of the composition. It is preferred that, for typical applications, polycarbonate is not present in the resin composition. Therefore, the preferred amount of polycarbonate is about 0% by weight which is not intended to exclude trace amounts of polycarbonate which do not have adverse effects on the physical properties and flame retardance of the resin composition.

Other additives may be contained in the resin composition of the present invention. The additives include an anti-dripping agent, an impact modifier, plasticizer, a heat stabilizer, an oxidation inhibitor, a light stabilizer, a compatibilizer and the like. An inorganic filler such as talc, silica, mica, glass fiber, an organic or inorganic pigment and/or dye can be added. The additives are employed in the amount of about 0–50 parts by weight on the basis of 100 parts by weight of the base resin.

The resin composition according to the present invention has Izod impact strength (1/8" notched) over 10 kg · cm/cm and heat deformation temperature of more than about 90° C. Further, the resin composition has flame retardancy (1/10") of V-0 or V-1, a good property of heat stability, and good characteristics of other physical properties.

The preferred method of preparing the flameproof thermoplastic resin is a two step process, wherein the first step is (i) preparing a master batch containing about 40–95 parts by weight of polyphenylene ether (PPE) (B), about 5–60 parts by weight of styrene-containing graft copolymer resin or styrene-containing copolymer resin (C) having about 5–18% by weight of acrylonitrile content, and about 0–30 parts by weight of aromatic phosphoric acid ester compound (D) at about 250–300° C. of molding temperature; and the subsequent second step is (ii) adding a rubber modified styrene-containing resin (A) and an aromatic phosphoric acid ester compound (D) to the master batch and extruding the resulting mixture at 200 to 260° C. molding temperature to produce a final resin composition comprising about 40–95 parts by weight of ABS resin, about 5–60 parts by weight of PPE (B), and about 5–30 parts by weight of aromatic phosphoric acid ester compound (D). To blend polyphenylene ether resin (B) with ABS resin, it is necessary to prepare master batch primarily by blending compatabilizer (C) comprising SAN or ABS including about 19–50% by weight of acrylonitrile in the copolymer excluding rubber and phosphate (D) as a plasticizer with polyphenylene ether resin (B).

By using a 2-step blending process, PPE having relatively higher working temperature than other components can be mixed easily. If PPE is preferably mixed with flameproof thermoplastic composition, the final resin composition has good physical properties. On the contrary, if the ABS resin including about 19–50% by weight of acrylonitrile in the copolymer excluding rubber (A), PPE (B), SAN having about 5–18% by weight of acrylonitrile (C) and phosphate (D) are mixed altogether in one step, the physical property fluctuation of the final resin is very large because PPE (B) does not mixed well with rubber modified styrene-containing resin (A) due to relatively higher working temperature of PPE (B) compared to other components.

Therefore it is preferable to prepare a master batch by blending PPE (B) with SAN or ABS (C) having about 5–18% by weight of acrylonitrile contents and a part of phosphate in a first step, and to blend the master batch with ABS resin (A) and residual phosphate (D) in a second step to prepare the final resin composition.

The invention may be better understood by reference to the following examples which are intended for the purpose of illustration and are not to be construed as in any way limiting the scope of the present invention. In the following examples, all parts and percentage are by weight unless otherwise indicated.

EXAMPLES

The components to prepare flameproof thermoplastic resin compositions in Examples 1–3 and Comparative Examples 1–4 are as follows:

(A) Rubber Modified Styrene-containing Resin (ABS)

A rubber modified styrene-containing resin was prepared by mixing 40% by weight of a styrene-containing graft copolymer resin with 60% by weight of a styrene-containing copolymer resin.

(a1) Styrene-containing Graft Copolymer Resin (ABS)

Fifty parts of butadiene rubber latex powder, 36 parts of styrene, 14 parts of acrylonitrile and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 10 parts of ferrous sulfate hydrate, and 0.3 parts of sodium pyrophosphate were added. The blend was kept at 75° C. for 5 hours to obtain ABS latex. To the ABS latex, 0.4 parts of sulfuric acid was added, coagulated and dried to obtain styrene-containing graft copolymer resin (g-ABS) in a powder form.

(a2) Styrene-containing Copolymer Resin (SAN with 25% by weight of acrylonitrile)

Seventy-five parts of styrene, 25 parts of acrylonitrile, 120 parts of deionized water and 0.2 parts of azobisisobutylonitrile were blended. To the blend, 0.4 parts of tricalciumphosphate and 0.2 parts of mercaptan-containing chain transfer agent were added. The resultant solution was heated to 80° C. for 90 minutes and kept for 180 minutes. The resultant was washed, dehydrated and dried. Styrene-acrylonitrile copolymer (SAN) having a weight average molecular weight of 160,000 to 200,000 was obtained.

(B) Polyphenylene Ether Resin

Poly(2,6-dimethyl-1,4-phenylene)ether with an intrinsic viscosity of 0.42 at chloroform solution was used. The particles had the average size of several microns ($\mu$m).

(C) Styrene-acrylonitrile Copolymer (SAN with 13% by weight of acrylonitrile)

Eighty-seven parts of styrene, 13 parts of acrylonitrile, 120 parts of deionized water, 0.1 parts of azobisisobutylonitrile, 0.2 parts of 1,1'-di(tertiarybutylperoxy)-3,3', 5-trimethylcyclohexane, 0.4 parts of tricalcium phosphate and 0.2 parts of mercaptan-containing chain transfer agent were blended. The resulting solution was heated up to 80° C. for 90 minutes and was kept at 80° C. for 150 minutes. The solution was heated up to 95° C. again and kept for 120 minutes. The resultant was washed, dehydrated and dried. Styrene-acrylonitrile copolymer (SAN) having a weight average molecular weight from 100,000 to 140,000 and 13% by weight of acrylonitrile content was obtained.

(D) Aromatic Phosphoric Acid Ester (D1) Tri(2,6-dimethylphenyl)phosphate with a melting point of 137° C.;

(D2) Triphenylphosphate (TPP) with a melting point of 48° C.; and (D3) Resorcinol diphenyl phosphate oligomer (RDP) which is liquid phase at room temperature.

(E) Phenolic Resin

Novolac phenolic resin of PSM 4324 Grade of Japan Gunei Co. was used herein.

The components to prepare flameproof thermoplastic resin compositions in Examples 1–3 and Comparative Examples 1–4 are shown in Table 1.

TABLE 1

| | Examples | | | Comparative Examples | | | |
|---|---|---|---|---|---|---|---|
| | 1 | 2 | 3 | 1 | 2 | 3 | 4 |
| Rubber modified styrene-containing resin (A) | 70 | 70 | 70 | 70 | 70 | 100 | 70 |
| Polyphenylene resin (B) | 30 | 30 | 30 | 30 | 30 | — | 30 |
| SAN (AN: 13 wt. %) (C) | 20 | 20 | 20 | — | 20 | 20 | — |
| Tri(2,6-dimethylphenyl) phosphate (D1) | 18 | 14 | 14 | 18 | 18 | 18 | 18 |
| Triphenyl phosphate (D2) | — | 4 | — | — | — | — | — |
| Resorcinol phenyl phosphate oligomer (D3) | — | — | 4 | — | — | — | — |
| Phenolic resin (E) | — | — | — | — | 6 | 6 | 6 |

In Examples 1–3 and Comparative Examples 1–4, the components were blended and extruded in the form of pellets with a twin-screw extruder at 200~280° C. The pellets were dried at 80° C. for 3 hours and extruded into test specimens in a 6 oz. extruder at molding temperature of 220~280° C. and barrel temperature of 40–80° C., and the resin pellets were molded into test specimens. Impact strengths of the test specimens of the Examples and Comparative Examples were measured according to Izod impact strength ASTM D-256 (⅛" notched), heat deformation temperatures were measured under load of 4.6 kg according to ASTM D-6498, and flame retardancy (1/10") was measured according to UL94 VB.

Heat stability was evaluated on the basis of whether color difference ($\Delta E$) between the test specimens was over 1 or whether black speck, black line, yellow line, and the like are visible to visual inspection. The color difference was measured using a colorimeter (Minolta 3700D CCM) to compare the color of specimens that were injection molded at 250° C. after a 10 minute stay as a melt in the cylinder of the injection machine with the color of specimens that were injection molded without any stay in the injection machine. The smaller the color difference between the specimens means better heat stability. The test results are presented in Table 2.

TABLE 2

| | Examples | | | Comparative Examples | | | |
|---|---|---|---|---|---|---|---|
| | 1 | 2 | 3 | 1 | 2 | 3 | 4 |
| Impact Strength (⅛") (kg • cm/cm) | 20 | 22 | 15 | 17 | 18 | 28 | 4 |
| heat deformation temp. (° C.) | 101 | 95 | 96 | 103 | 98 | 95 | 96 |
| UL 94 (1/10") | V-1 | V-1 | V-1 | V-1 | V-1 | fail | V-1 |
| heat stability | good | good | good | good | bad | bad | bad |

A flameproof resin applied for commercial purpose should have Izod impact strength of more than 10, and heat deformation temperature of over about 90° C.

As shown in Examples 1–3, the resin composition of the present invention had good impact strengths due to styrene-acrylonitrile copolymer or styrene-containing graft copolymer (C) improving compatibility between ABS resin and polyphenylene ether. Further, flame retardancy, heat resistance, and heat stability were enhanced. When compared with impact strengths of 15–22 obtained in Examples 1–3, Comparative Example 1 not employing the component (C) showed impact strength reduced to 7. Comparative Examples 2 –4 containing phenolic resin (E) showed much lower heat stability, in comparison with the Examples.

The desired flame retardancy was obtained when all the components in Examples were employed, but flame retardancy was not shown in Comparative Example 3 excluding polyphenylene ether (B). In consideration of final heat resistance, the phosphoric acid ester may be used in combination with other phosphoric acid ester compound as shown Examples 2 –3. Furthermore, the mixture of more volatile phosphoric acid ester and less volatile phosphoric acid ester may be used to improve flame retardancy.

The components to prepare flameproof thermoplastic resin compositions containing triphenylphosphate as component (D) in Example 4 and Comparative Examples 5–6 are shown in Table 3.

TABLE 3

| | Example | Comparative Examples | |
|---|---|---|---|
| | 4 | 5 | 6 |
| Rubber modified styrene-containing resin (A) | 70 | 70 | 70 |
| Polyphenylene ether (B) | 30 | 30 | 30 |
| SAN (AN: 13 wt. %) (C) | 15 | — | 15 |
| Triphenyl phosphate (D) | 17 | 17 | 17 |
| Phenolic resin | — | — | 5 |

The test results are presented in the following Table 4.

TABLE 4

| | Example | Comparative Examples | |
|---|---|---|---|
| | 4 | 5 | 6 |
| Impact Strength (⅛") (kg · cm/cm) | 25 | 7 | 20 |
| Heat deformation Temperature (° C.) | 90 | 91 | 88 |
| UL 94 (1/10") | V-1 | V-1 | V-1 |
| Heat stability | good | good | bad |

A flameproof resin applied for commercial purpose should have Izod is impact strength of more than 10, and show suitable heat deformation temperature and a good property of heat stability. As shown in Example 4, the resin composition of the present invention had a good impact strength due to styrene-acrylonitrile copolymer or styrene-containing graft copolymer (C) improving compatibility between ABS resin and polyphenylene ether. Further, flame retardancy, heat resistance, and heat stability were enhanced. When compared with impact strength of 25 obtained in Example 4, Comparative Example 5 not employing the component (C) showed impact strength reduced to 7. Comparative Example 6 containing phenolic resin (E) showed much lower heat stability in comparison with Example 4.

Method Example 5

In the first step 70 parts of PPE, 30 parts of SAN having 13% by weight of acrylonitrile contents and 10 parts of TPP were blended and extruded in the form of pellets with a 45 ~ twin-screw extruder at 270° C. In the second step, 47 parts of master batch prepared in the first step, 28 parts of graft ABS resin (a1), 29.2 parts of normal SAN resin (a2) with 25% by weight of acrylonitrile and 12.7 parts of TPP were blended and extruded in the form of final resin components with a 45 Φ twin-screw extruder at 230° C.

Comparative Example 7

Twenty-eight parts of normal graft ABS resin (a1), 42 parts of normal SAN resin (a2) with 25% by weight of AN, 30 parts of PPE and 17 parts of TPP were blended and extruded in the form of pellets with a 45 Φ twin-screw extruder at 270° C. in one step.

Comparative Example 8

Twenty-eight parts of normal graft ABS resin (a1), 29.2 parts of SAN resin (a2) with 25% by weight of AN, 12.8 parts of SAN resin with 13% by weight of AN, 30 parts of PPE and 17 parts of TPP were blended and extruded in the form of pellets with a 45 Φ twin-screw extruder at 270° C. in one step. The pellets were dried at 80° C. for 3 hours and extruded into test specimens in a 6 oz. extruder at molding temperature of 220~280° C. and barrel temperature of 40~80° C., and the resin pellets were molded into test specimens. Impact strengths of the test specimens of Example and Comparative Examples were measured according to Izod impact strength ASTM D-256 (⅛" notch), Vicat softening temperatures were measured according to ASTM D-648 under 4.6 kg and flame retardancy (1/10") was measured according to UL94 VB. The test results are presented in Table 5

TABLE 5

|  | Example | Comparative Examples | |
|---|---|---|---|
|  | 5 | 7 | 8 |
| Impact Strength (⅛") (kg · cm/cm) | 25 | 6 | 17 |
| Vicat softening temperature (° C.) | 91 | 92 | 91 |
| Flame retardance (1/10") | V-1 | V-1 | V-1 |
| Degree of luster | 95 | 80 | 87 |

A flameproof resin suitable for commercial purpose should have Izod impact strength of more than 10, and heat deformation temperature of over about 90° C. According to Example 5, the compatibility between ABS resin and polyphenylene ether resin is developed by using compatabilizer (C). Therefore it shows excellent impact strength, heat resistance, flam resistance and thermal stability. When compared with impact strengths, Comparative Example 7 not employing component (C) showed reduced impact strength. As described above, the resin composition of the this invention have good mechanical properties due to improved compatibility by adding the resin (C) to the base resin. Comparative Example 8 has the same of components (A), (B), (C) as Example 5 but Comparative Example 8 is one-step process whereas Example 5 is two-step process. Example 5 has the better impact strength and degree of luster despite the same composition. It means that each component was well mixed in Example 5.

As described above, the resin composition of the present invention have good mechanical properties due to compatibility improved by adding the resin (C) to the base resin, and shows good flame retardancy without the need to use phenolic resin or red phosphorous as an auxiliary flame retardant. In addition, heat resistance, impact strength, and heat stability were improved, as shown by comparing the results of the Examples with the results obtained in the Comparative Examples.

The following tables show other examples of compositions which show the effect of varying the acrylonitrile content. Comparative examples of compositions containing phenolic resins which are outside the scope of the present invention are also included which show the adverse effect on impact strenght and/or heat stability when phenolic resin is added to the compositions.

TABLE 6

|  | Examples | | | Comparative Examples | | | |
|---|---|---|---|---|---|---|---|
|  | 6 | 7 | 8 | 9 | 10 | 11 | 12 |
| ABS (A) | 70 | 70 | 70 | 70 | 70 | 70 | 70 |
| PPE (B) | 30 | 30 | 30 | 30 | 30 | 30 | 30 |
| SAN (AN 3%) | — | — | — | 20 | — | — | — |
| SAN (AN 5%) | 20 | — | — | — | — | — | — |
| SAN (AN 10%) | — | 20 | — | — | — | — | — |
| SAN (AN 15%) | — | — | 20 | — | — | — | — |
| SAN (AN 20%) | — | — | — | — | 20 | — | — |
| SAN (AN 26%) | — | — | — | — | — | 20 | — |
| SAN (AN 35%) | — | — | — | — | — | — | 20 |
| Tri-(2,6-dimethylphenyl) phosphate | 18 | 18 | 18 | 18 | 18 | 18 | 18 |
| Impact Strength | 14 | 17 | 17 | 4 | 6 | 6 | 5 |
| HDT | 98 | 99 | 102 | 98 | 101 | 103 | 102 |
| UL 94 | V-1 | V-1 | V-1 | V-1 | V-1 | V-1 | V-1 |
| Heat Stability (Δ E) | 0.2 | 0.3 | 0.3 | 0.2 | 0.2 | 0.3 | 0.2 |

TABLE 7

|  | Examples | | | Comparative Examples | | | | | |
|---|---|---|---|---|---|---|---|---|---|
|  | 9 | 10 | 11 | 13 | 14 | 15 | 16 | 17 | 18 |
| ABS (A) | 70 | 70 | 70 | 70 | 70 | 70 | 70 | 70 | 70 |
| PPE (B) | 30 | 30 | 30 | 30 | 30 | 30 | 30 | 30 | 30 |
| SAN (AN 3%) | — | — | — | 15 | — | — | — | — | — |
| SAN (AN 5%) | 15 | — | — | — | — | — | — | — | — |
| SAN (AN 10%) | — | 15 | — | — | — | — | — | — | — |
| SAN (AN 15%) | — | — | 15 | — | — | — | — | — | — |

TABLE 7-continued

| | Examples | | | Comparative Examples | | | | | |
|---|---|---|---|---|---|---|---|---|---|
| | 9 | 10 | 11 | 13 | 14 | 15 | 16 | 17 | 18 |
| SAN (AN 20%) | — | — | — | — | 15 | — | — | — | — |
| SAN (AN 26%) | — | — | — | — | — | 15 | — | — | 15 |
| SAN (AN 35%) | — | — | — | — | — | — | 15 | — | — |
| TPP (D) | 17 | 17 | 17 | 17 | 17 | 17 | 17 | 17 | 17 |
| Phenolic resin | — | — | — | — | — | — | — | 5 | 5 |
| Impact Strength | 17 | 22 | 22 | 8 | 11 | 10 | 9 | 20 | 7 |
| HDT | 90 | 90 | 92 | 88 | 91 | 92 | 91 | 88 | 89 |
| UL 94 | V-1 | V-1 | V-1 | V-1 | V-1 | V-1 | V-1 | V-1 | V-1 |
| Heat Stability (Δ E) | 0.2 | 0.2 | 0.4 | 0.3 | 0.3 | 0.2 | 0.3 | 4.6 | 4.2 |

Many modifications and changes may be deemed to be with the scope of the present invention as defined in the following claims.

What is claimed is:

1. A flameproof thermoplastic resin composition substantially free of phenolic resin and red phosphorous comprising:
   (A) about 40–95 parts by weight of a rubber modified styrene-containing resin comprising:
      (a1) about 20–95% by weight of a styrene-containing graft copolymer resin containing about 19–50% by weight of acrylonitrile or methacrylonitrile in the copolymer excluding rubber and
      (a2) about 5–80% by weight of a styrene-containing copolymer containing about 19–50% by weight of acrylonitrile or methacrylonitrile;
   (B) about 5–60 parts by weight of a polyphenylene ether resin;
   (C) about 2–40 parts by weight of a compatabilizer comprising
      (c1) a styrene-containing copolymer containing about 5–18% by weight of acrylonitrile in the copolymer per 100 parts by weight of the sum of (A) and (B) or
      (c2) a styrene-containing graft copolymer having up to about 60% by weight of rubber wherein the compatabilizer contains about 5–18% by weight of acrylonitrile in the copolymer excluding rubber, per 100 parts by weight of the sum of (A) and (B); and
   (D) about 5–30 parts by weight of an aromatic phosphoric acid ester per 100 parts by weight of the sum of (A) and (B),
   wherein the resin composition contains less than 3% by weight of polycarbonate based on the total weight of the composition.

2. A flameproof resin composition according to claim 1 comprising about 60–85 parts by weight of (A), about 15–40 parts by weight of (B), about 5–20 parts by weight of (C), and about 5–20 parts by weight (D).

3. A flameproof resin composition according to claim 2 wherein (A) is comprised of about 25–70% by wt. of (a1) and about 30–75% by wt. of (a2).

4. A flameproof resin composition according to claim 3 wherein (a1) and (a2) each contain about 20–35% by weight of acrylonitrile.

5. A flameproof resin composition according to claim 2 wherein compatabilizer (C) contains about 10–18% by weight of acrylonitrile.

6. The flameproof thermoplastic resin composition according to claim 2, wherein said polyphenylene ether (B) is poly(2,6-dimethyl-1,4-phenylene)ether.

7. A flameproof resin composition according to claim 1 wherein the resin composition contains less than 2% by weight polycarbonate based on the total weight of the composition.

8. A molded article produced from the flameproof thermoplastic resin compositions according to claim 1.

9. The flameproof thermoplastic resin composition according to claim 1, wherein said aromatic phosphoric acid ester is represented by following formula:

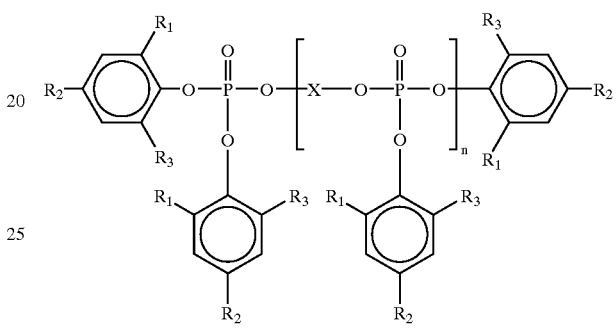

wherein $R_1$, $R_2$ and $R_3$ independently of one another are hydrogen or $C_1$–$C_4$ alkyl; X is a dialcohol derivative selected from the group consisting of resorcinol, diphenol, hydroquinol, bisphenol-A and bisphenol-S; and n is 0–4.

10. The flameproof thermoplastic resin composition according claim 1, wherein said aromatic phosphoric acid ester is represented by following formula:

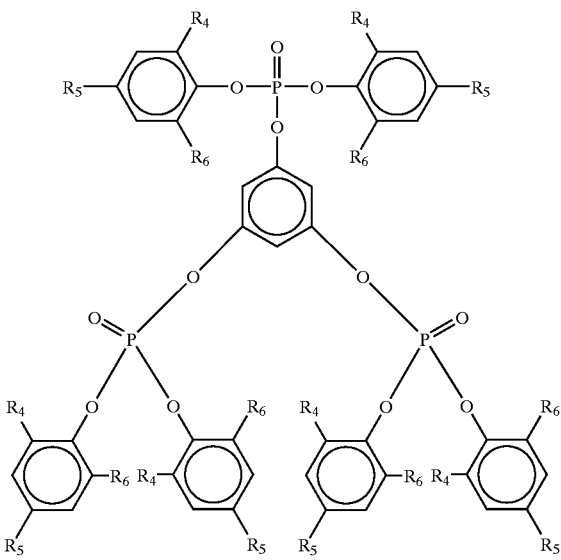

wherein $R_4$, $R_5$ and $R_6$ are hydrogen or $C_1$–$C_4$ alkyl.

11. The flameproof thermoplastic resin composition as defined in claim 1, wherein said aromatic phosphoric acid ester (D) is triphenylphosphate.

12. The flameproof thermoplastic resin composition as defined in claim 1, wherein said aromatic phosphoric acid ester is selected from the group consisting of tri(2,6- dimethyl phenyl)phosphate, tri(2,4,6-trimethyl phenyl) phosphate, tri(2,4-ditertiary butyl phenyl)phosphate, tri(2,6-ditertiary butyl phenyl)phosphate, resorcinolbis(diphenyl) phosphate, resorcinolbis(2,6-dimethyl phenyl)phosphate, resorcinolbis(2,4-ditertiary butyl phenyl)phosphate, hydroquinol(2,6-dimethyl phenyl)phosphate, hydroquinol (2,4-ditertiary butyl phenyl)phosphate.

13. The flameproof thermoplastic resin composition as defined in claim 1, wherein said aromatic phosphoric acid ester is tri(2,6-dimethyl phenyl)phosphate.

14. The flameproof thermoplastic resin composition as defined in claim 9, wherein said aromatic phosphoric acid ester (D) has a melting point of 90° C. or more.

15. A flameproof thermoplastic resin composition comprising:
(A) about 40–95 parts by weight of a rubber modified styrene-containing resin comprising
   ($a_1$) about 20–95% by weight of a styrene-containing graft copolymer resin containing about 19–50% by weight of acrylonitrile or methacrylonitrile in the copolymer excluding rubber and
   ($a_2$) about 5–80% by weight of a styrene-containing copolymer containing about 19–50% by weight of acrylonitrile or methacrylonitrile;
(B) about 5–60 parts by weight of a polyphenylene ether resin;
(C) about 2–40 parts by weight of a compatabilizer comprising
   (c1) a styrene-containing copolymer containing about 5–18% by weight of acrylonitrile in the copolymer per 100 parts by weight of the sum of (A) and (B) or
   (c2) a styrene-containing graft copolymer having up to about 60% by weight of rubber wherein the compatabilizer contains about 5–18% by weight of acrylonitrile in the copolymer excluding rubber, per 100 parts by weight of the sum of (A) and (B); and
(D) about 5–30 parts by weight of an aromatic phosphoric acid ester per 100 parts by weight of the sum of (A) and (B),
wherein the resin composition contains about 0% by weight of phenolic resin, red phosphorous, and silicone resin based on the total weight of the composition.

16. A flameproof resin composition according to claim 15 comprising about 60–85 parts by weight of (A), about 15–40 parts by weight of (B), about 5–20 parts by weight of (C), and about 5–20 parts by weight (D).

17. A flameproof resin composition according to claim 16 wherein (A) is comprised of about 25–70% by weight (a1) and about 30–75% by weight (a2).

18. A flameproof resin composition according to claim 17 wherein (a1) and (a2) each contain about 20–35% by weight of acrylonitrile.

19. A flameproof resin composition according to claim 16 wherein (c1) or (c2) in compatbilizer (C) contains about 10–18% by weight of acrylonitrile.

20. The flameproof thermoplastic resin composition according to claim 16, wherein said aromatic phosphoric acid ester is represented by following formula:

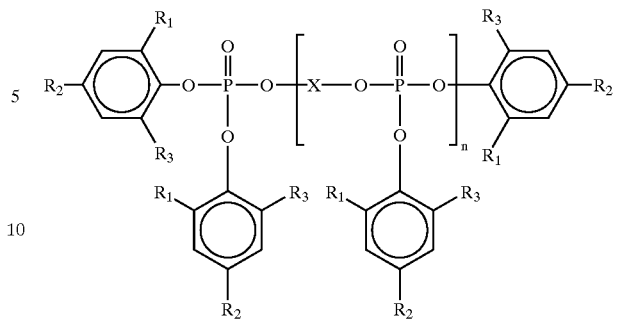

wherein $R_1$, $R_2$ and $R_3$ independently of one another are hydrogen or $C_1$–$C_4$ alkyl; X is a dialcohol derivative selected from the group consisting of resorcinol, diphenol, hydroquinol, bisphenol-A and bisphenol-S; and n is 0–4.

21. A flameproof resin composition according to claim 15 wherein the resin composition contains less than about 2% by weight of polycarbonate.

22. A molded article produced from the flameproof thermoplastic resin compositions according to claim 15.

23. A flameproof thermoplastic resin composition substantially free of phenolic resin and red phosphorous comprising:
(A) about 40–95 parts by weight of a rubber modified styrene-containing resin comprising
   (a1) about 20–95% by weight of a styrene-containing graft copolymer resin containing about 19–50% by weight of acrylonitrile or methacrylonitrile in the copolymer excluding rubber and
   (a2) about 5–80% by weight of a styrene-containing copolymer containing about 19–50% by weight of acrylonitrile or methacrylonitrile;
(B) about 5–60 parts by weight of a polyphenylene ether resin;
(C) about 2–40 parts by weight of a compatabilizer comprising
   (c1) a styrene-containing copolymer containing about 5–18% by weight of acrylonitrile in the copolymer excluding rubber, per 100 parts by weight of the sum of (A) and (B) or
   (c2) a styrene-containing graft copolymer having up to about 60% by weight of rubber wherein the compatabilizer contains about 5–18% by weight of acrylonitrile in the copolymer excluding rubber, per 100 parts by weight of the sum of (A) and (B); and
(D) about 5–30 parts by weight of an aromatic phosphoric acid ester per 100 parts by weight of the sum of (A) and (B),
wherein the resin composition contains about 0% by weight silicone resin based on the total weight of the composition.

24. A flameproof thermoplastic resin composition substantially free of phenolic resin and red phosphorous comprising:
(A) about 40–95 parts by weight of a rubber modified styrene-containing resin comprising
   (a1) about 20–95% by weight of a styrene-containing graft copolymer resin containing about 19–50% by weight of acrylonitrile or methacrylonitrile in the copolymer excluding rubber and
   (a2) about 5–80% by weight of a styrene-containing copolymer containing about 19–50% by weight of acrylonitrile or methacrylonitrile;
(B) about 5–60 parts by weight of a polyphenylene ether resin;

(C) about 2–40 parts by weight of a compatabilizer comprising
  (c1) a styrene-containing copolymer containing about 5–18% by weight of acrylonitrile in the copolymer excluding rubber, per 100 parts by weight of the sum of (A) and (B) or
  (c2) a styrene-containing graft copolymer having up to about 60% by weight of rubber wherein the compatabilizer contains about 5–18% by weight of acrylonitrile in the copolymer excluding rubber, per 100 parts by weight of the sum of (A) and (B); and
(D) about 5–30 parts by weight of an aromatic phosphoric acid ester per 100 parts by weight of the sum of (A) and (B),
wherein the resin composition contains less than 3% by weight of polycarbonate based on the total weight of the composition, wherein the resin composition is produced in a two-step process comprising
  a first step (i) preparing a master batch containing about 40–95 parts by weight of polyphenylene ether (PPE) (B), about 5–60 parts by weight of compatabilizer (C) having about 5–18% by weight of acrylonitrile content, and about 0–30 parts by weight of aromatic phosphoric acid ester compound (D) at about 250–300° C. of molding temperature; and
  a subsequent second step (ii) adding a rubber modified styrene-containing resin (A) and aromatic phosphoric acid ester compound (D) to the master batch and extruding the resulting mixture at about 200–260° C.

25. A method of producing a flameproof thermoplastic resin composition substantially free of phenolic resin and red phosphorous and contains less than 3% by weight of polycarbonate based on the total weight of the composition wherein the resin composition comprises
  (A) about 40–95 parts by weight of a rubber modified styrene-containing resin comprising
    (a1) about 20–95% by weight of a styrene-containing graft copolymer resin containing about 19–50% by weight of acrylonitrile or methacrylonitrile in the copolymer excluding rubber and
    (a2) about 5–80% by weight of a styrene-containing copolymer containing about 19–50% by weight of acrylonitrile or methacrylonitrile;
  (B) about 5–60 parts by weight of a polyphenylene ether resin;
  (C) about 2–40 parts by weight of a compatabilizer comprising
    (c1) a styrene-containing copolymer containing about 5–18% by weight of acrylonitrile in the copolymer excluding rubber, per 100 parts by weight of the sum of (A) and (B) or
    (c2) a styrene-containing graft copolymer having up to about 60% by weight of rubber wherein the compatabilizer contains about 5–18% by weight of acrylonitrile in the copolymer excluding rubber, per 100 parts by weight of the sum of (A) and (B); and
  (D) about 5–30 parts by weight of an aromatic phosphoric acid per 100 parts by weight of the sum of (A) and (B),
wherein the method is a two-step process comprising
  a first step (i) preparing a master batch containing about 40–95 parts by weight of polyphenylene ether (PPE) (B), about 5–60 parts by weight of compatabilizer (C) and about 0–30 parts by weight of aromatic phosphoric acid ester compound (D) at about 250–300° C. of molding temperature; and then
  a subsequent second step (ii) adding a rubber modified styrene-containing resin (A) and aromatic phosphoric acid ester compound (D) to the master batch and extruding the resulting mixture at about 200–260° C.

26. The method according to claim 25, wherein said aromatic phosphoric acid ester is represented by following formula:

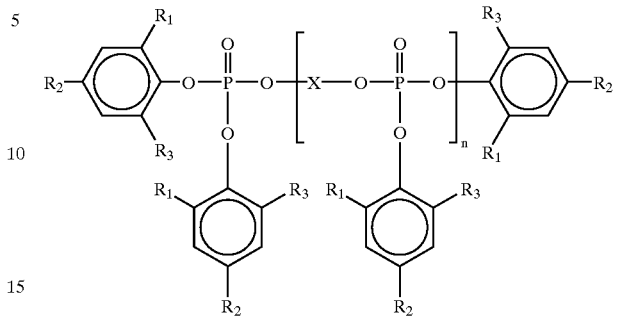

wherein $R_1$, $R_2$ and $R_3$ independently of one another are hydrogen or $C_1$–$C_4$ alkyl; X is a dialcohol derivative selected from the group consisting of resorcinol, diphenol, hydroquinol, bisphenol-A and bisphenol-S; and n is 0–4.

27. The method according claim 25, wherein said aromatic phosphoric acid ester is represented by following formula:

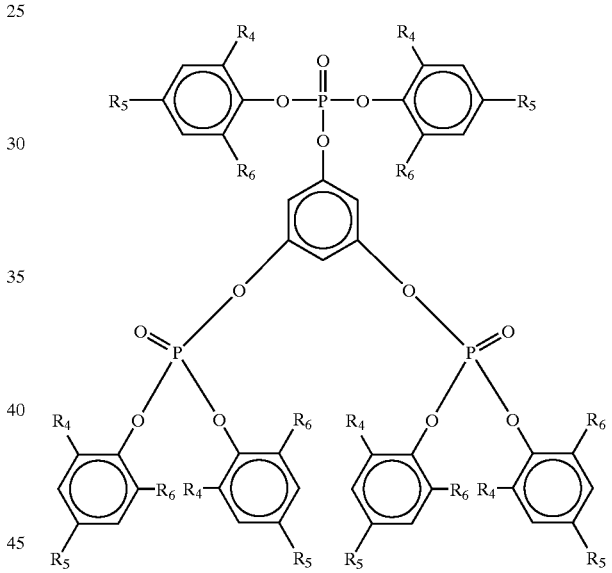

wherein $R_4$, $R_5$ and $R_6$ are hydrogen or $C_1$–$C_4$ alkyl.

28. The method according to claim 25 wherein said aromatic phosphoric acid ester compound has a melting point of 90° C. or more.

29. The method according to claim 25 wherein said polyphenylene ether resin is poly(2,6-dimethyl-1,4-phenylene)ether.

30. The method according to claim 25 wherein the compatabilizer (C) comprises (c2).

31. The method according to claim 25 wherein the styrene-containing copolymer (c1) or graft styrene-containing copolymer (c2) further comprises a monomer selected from the group consisting of methacrylate, maleic anhydride and phenyl maleimide.

32. The method as defined in claim 25 wherein component (A) is comprised of an ABS resin, an acrylonitrile-acryl rubber-styrene (AAS) resin, an acrylonitrile-ethylenepropylene rubber-styrene (AES) resin, or a mixture thereof.

* * * * *